United States Patent [19]

Igarashi et al.

[11] 4,348,726
[45] Sep. 7, 1982

[54] METHOD OF CONTROLLING AUTOMOBILE EQUIPMENT AND CONTROL APPARATUS

[75] Inventors: Osamu Igarashi, Katsuta; Masaru Kugo, Ogawamura; Shizuhisa Watanabe, Katsuta, all of Japan

[73] Assignee: Hitachi, Ltd., Tokyo, Japan

[21] Appl. No.: 136,732

[22] Filed: Apr. 2, 1980

[30] Foreign Application Priority Data

| Apr. 4, 1979 [JP] | Japan | 54/39788 |
| Jul. 27, 1979 [JP] | Japan | 54/94954 |
| Jul. 27, 1979 [JP] | Japan | 54/94985 |

[51] Int. Cl.³ .......................................... G06F 15/46
[52] U.S. Cl. ..................................... 364/424; 364/569
[58] Field of Search .............. 364/569, 424, 431, 579, 364/580; 73/116, 117.1, 117.3

[56] References Cited

U.S. PATENT DOCUMENTS

| 4,063,539 | 12/1977 | Gorille et al. | 364/569 X |
| 4,099,495 | 7/1978 | Kiencke et al. | 364/569 X |
| 4,140,391 | 2/1979 | Laciak et al. | 364/569 X |
| 4,142,238 | 2/1979 | Brandt et al. | 364/569 X |
| 4,165,459 | 8/1979 | Curtice | 364/569 |
| 4,192,130 | 3/1980 | Takeuchi | 364/569 X |
| 4,209,833 | 6/1980 | Krupp et al. | 364/569 |
| 4,225,925 | 9/1980 | Hattori et al. | 364/569 X |
| 4,231,091 | 10/1980 | Motz | 364/569 X |
| 4,232,368 | 11/1980 | Hill et al. | 364/569 X |
| 4,245,296 | 1/1981 | Small et al. | 364/569 X |

Primary Examiner—Edward J. Wise
Attorney, Agent, or Firm—Craig and Antonelli

[57] ABSTRACT

In the operation of a control computer, an interruption takes place at constant intervals of time, and the driving periods of different kinds of accessory equipment are controlled by utilizing the number of times of interruption occurrence.

9 Claims, 21 Drawing Figures

F I G. 16
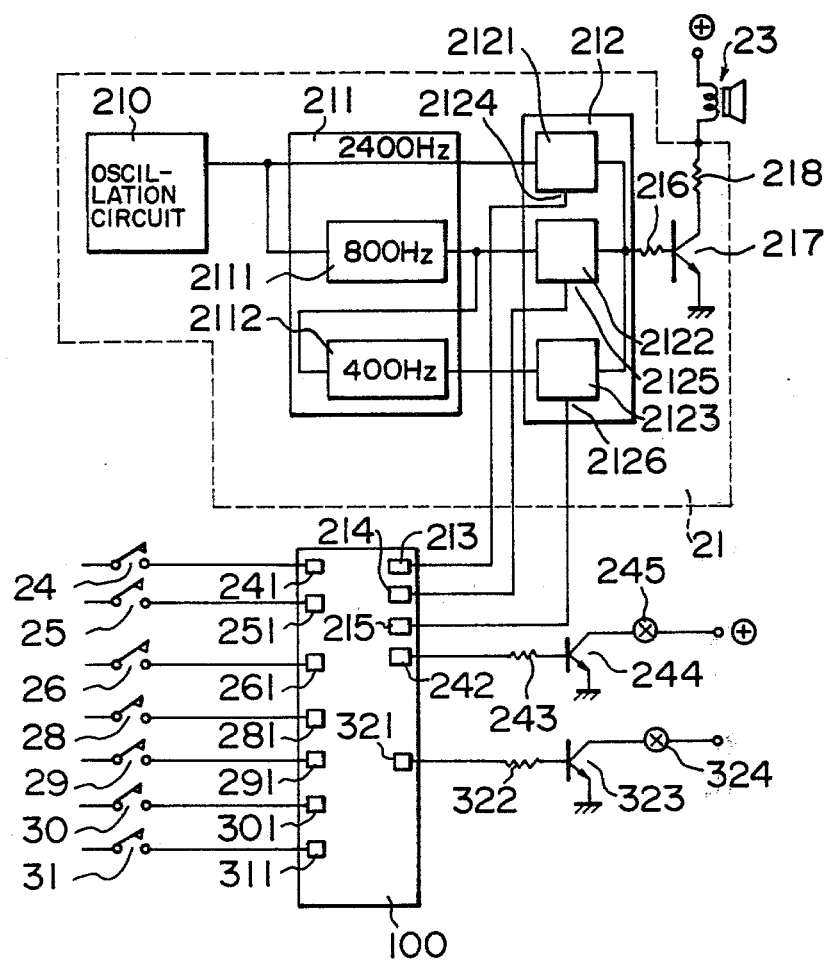

METHOD OF CONTROLLING AUTOMOBILE EQUIPMENT AND CONTROL APPARATUS

FIELD OF THE INVENTION

The present invention relates to a method of controlling automobile equipment and a control apparatus therefor and, particularly, to a method of controlling automobile equipment and control apparatus for concentrative control of the auxiliary equipment on a vehicle.

BACKGROUND OF THE INVENTION

The automobile has various kinds of equipment, including the engine, to be controlled. Recently, most equipment for the automobile is of the electronically controlled type. Particularly, in the engine or similar parts, a control computer is used for concentrative control of the fuel injection system, carburetor or ignition.

A control apparatus for accessory equipment on a vehicle, other than the engine, provides different kinds of information for the driver. For example, information that the car speed exceeds a limited value, one or a plurality of head lamps are disconnected, or the engine key has been left inserted, is transmitted to the driver by means of sound or light, or the combination of both. The control apparatus has means for establishing a time period for the basis of a control in order to provide a pitch and intermittent period of sound and a flickering period of light. In addition, there are a clock, intermittent drive of wipers, and turn signal flickering which are directly controlled by this time period, thus requiring means for establishing the time period. Furthermore, there are car speed, engine temperature, or the combination of both which are employed to represent the operational state of the automobile, and in which, time is often used for the control element.

In the prior art, a control unit is produced for each accessory piece of equipment and a control circuit is provided for each function.

However, with the development of electronics, the number of accessories mounted on the vehicle has increased, and it has been desired to provide a single control unit with many functions which occupies less space and is compact.

In order for the driver to drive safely and comfortably, it is necessary that information by means of sound or light be correctly transmitted to the driver. Means for establishing time as the base of control has generally been through the use of frequency dividing circuits for properly dividing the frequency of the output signal from an oscillator. However, many different frequencies are required, and such frequency dividers are complicated and, thus, expensive. Particularly, in a conventional system in which a control device is used for each accessory, this drawback becomes prominent.

On the other hand, it is known to use a single computer for controlling a number of accessories; for example, see Japanese Patent Application Laid-Open No. 78535/1978 (Priority: French Patent application Nos. 76/32563 and 77/9285). However, the computer used in such a system is of the wired logic type which requires a frequency divider for each controlled object. Thus, such an apparatus is complicated and expensive.

SUMMARY OF THE INVENTION

It is an object of the invention to use an inexpensive apparatus employing a single computer for conrolling a number of accessories on an automobile.

The feature of the invention is that, in the operation of a control computer, an interruption takes place at constant intervals of time, and a plurality of different frequencies are produced by the use of the number of times of interruption occurence to thereby control the period of operation of different kinds of accessories. More specifically, a turn signal hazard and parking warner (alert or alarm), by way of example, flicker an alarm lamp or intermittently emanate an alarm sound each time an interruption occurs. Moreover, an alarm buzzer indicating a foregetting to turn off the lights is driven every second interruption, and an alarm buzzer as a speed warner (alert or alarm) is driven every fourth interruption; thus, these buzzers are interruptedly driven at $\frac{1}{2}$ and $\frac{1}{4}$ of the frequency in case of the turn signal hazard, respectively. The timing of the interruption is determined by the necessary frequency and of course is irrespective of the degree of importance in processing or priority.

DETAILED DESCRIPTION OF THE DRAWINGS

The present invention will be apparent from the following detailed description taken in conjunction with the accompanying drawings, in which:

FIG. 16 shows an example of the alarm circuit;

DETAILED DESCRIPTION

An embodiment of the present invention will hereinafter be described with reference to the drawings.

Figure 1:
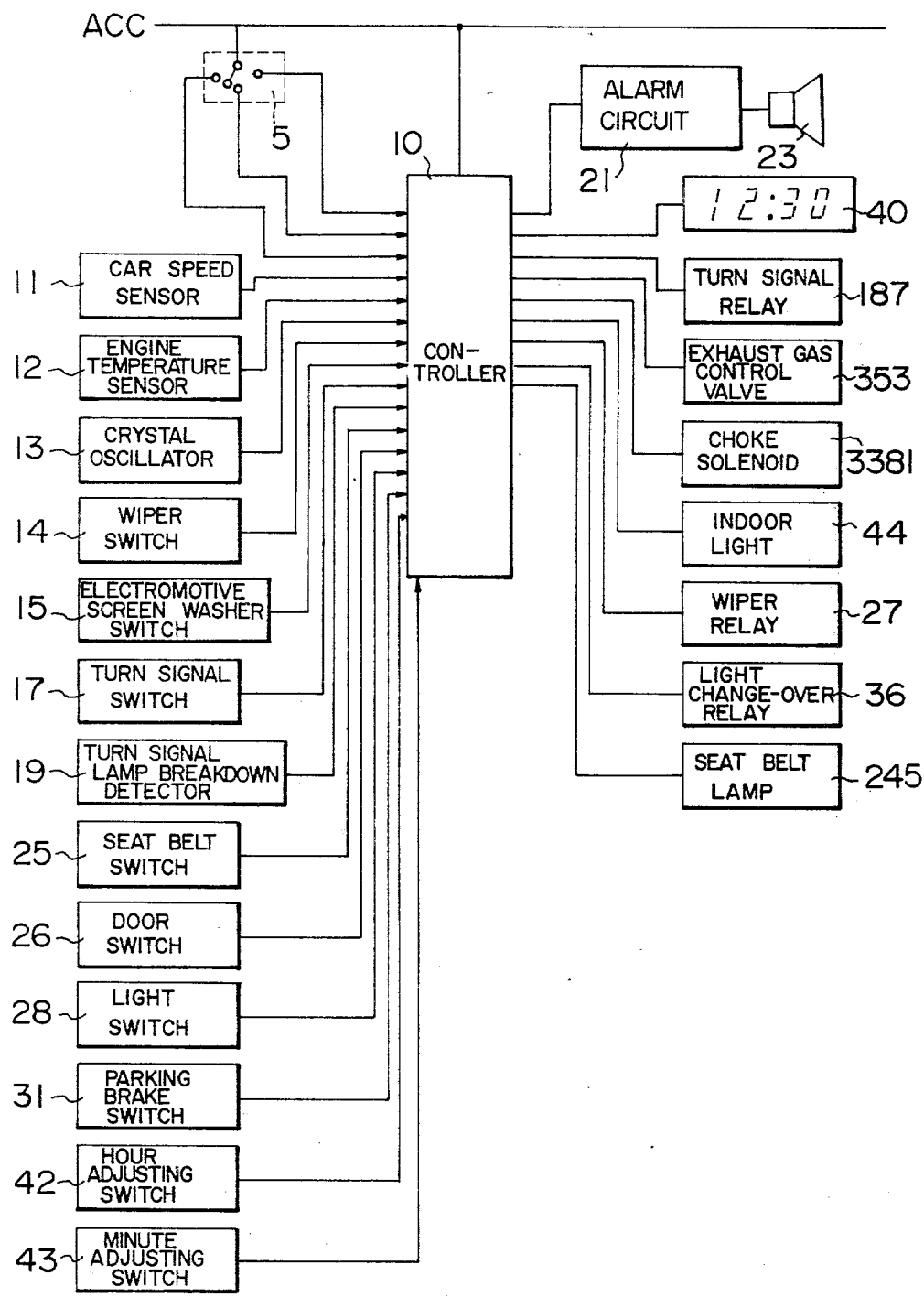
FIG. 1 is a block diagram of one embodiment of an automotive control apparatus according to the invention.

Referring to FIG. 1, there is shown a controller 10 to which are applied "0" and "1" signals from a car speed sensor 11, an analog signal from an engine temperature sensor 12, a signal from a crystal oscillator 13, a signal from a wiper switch 14, a signal from an electromotive screen washer switch 15, a signal from a seat belt switch 25 provided at a seat belt which signal is indicative of whether the seat belt is fastened or not, a signal from a light switch 28, a signal from a parking brake switch 31, a signal from a door switch 26, and signals from hour and minute adjusting switches 42 and 43 for the clock. In addition, to the controller 10 are applied an ignition signal, a starter signal and a key insertion signal indicating that key is left inserted, from a key switch 5, and signals from a turn signal switch 17 and a turn signal lamp breakdown detector 19.

The outputs of the controller 10 are applied to an alarm speaker 23 for emitting a warning sound, an alarm circuit 21 for driving the speaker 23, a digital indicator 40 indicative of time on a clock, a wiper relay 27, a seat belt lamp 245, a light change-over relay 36, a turn signal relay 187, an exhaust gas control valve 353, an automatic return type choke solenoid 3381 and an indoor light 44.

The controller 10 includes a computer for control which functions in a time-sharing manner as described below. The computer for control incorporates a timer or clock circuit which provides an interruption after a constant interval of time has elapsed from the setting to a certain value. In addition, the control computer separately executes main and interruption routines.

Figure 2:
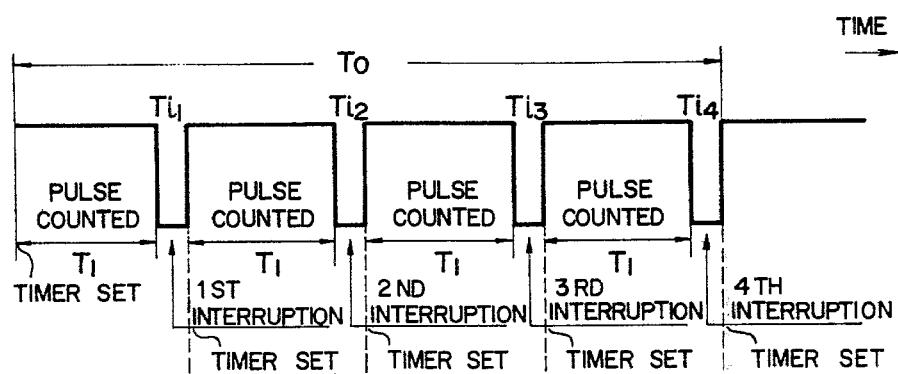
FIG. 2 is a timing diagram of interruption processing in the control computer in FIG. 1.

As shown in FIG. 2, in the main routine, a counting operation is effected of the pulses from the car speed sensor 11 and the pulses from the engine temperature sensor 12, the latter pulses being converted from a signal from the sensor 12 by a method to be described later. A constant time after starting the counting of these, pulses, an interruption (IRQ) takes place, and during the interruption process the other input and output processes are performed.

Figure 3:
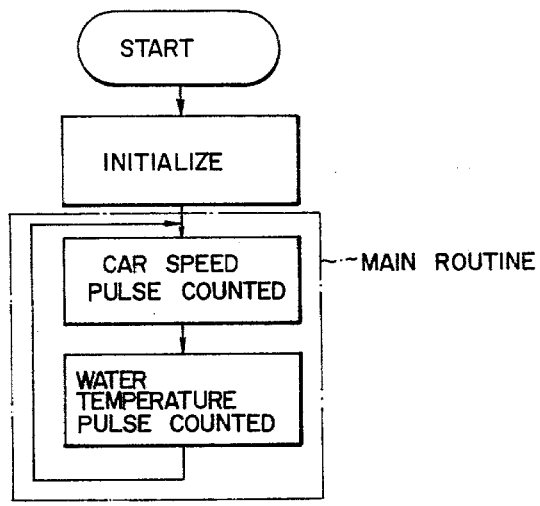
FIG. 3 is a main routine for the control computer in FIG. 1.

The car speed and temperature pulses are counted in a main routine, for example, as shown in FIG. 3.

When the power supply is turned on, an initialization step starts, that is, constants to be established are stored in a prescribed area of memory. Then, relatively high speed pulses, such as car speed and water temperature pulses, are counted. The counting is started from the time that the timer is set to a predetermined value and continues summing the number of pulse changes of "0" and "1" until an interruption occurs.

Figure 4:
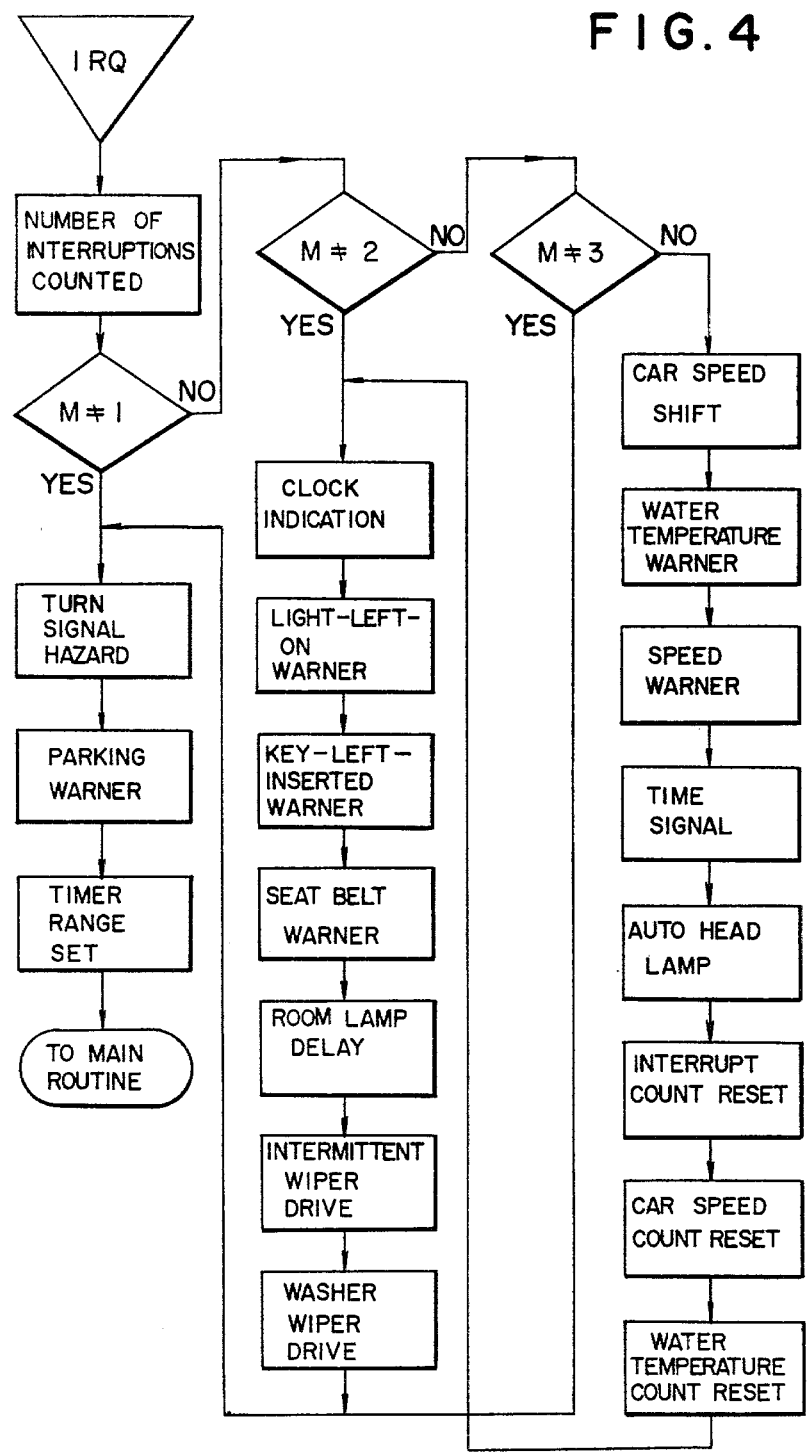
FIG. 4 is a subroutine for the control computer in FIG. 1.

Upon the occurrence of an interruption, the counting operation stops and the interruption routine as shown in FIG. 4 starts. After the interruption routine has finished, the main routine starts again. Each time an interruption occurs, a counting is effected of the number of repetition occurrences. The interruption routine may completely be executed at a single interruption, or using several interruptions as illustrated. That is, in the routine, some steps are executed at each interruption, others are executed once at every second time, or others are executed once at every third or fourth time. The processing time of the interruption differs each time depending on input and output conditions. If it is assumed that time from when the timer is set, to the occurence of an interruption is $T_1$ and the interruption processing time is $Ti_1$ to $Ti_4$, a time $T_0$ required for the four interruptions to be executed is given by $$T_0 = 4T_1 + Ti_1 + Ti_2 + Ti_3 + Ti_4$$

where, if $T_1$ is much larger than $Ti$, $T_0$ is nearly equal to $4T_1$ even though $Ti$ slightly changes at each interruption. Thus, control with respect to time is made at each function on the basis of the number of interruptions. In the routine shown in FIGS. 3 and 4, $T_0$ is 300 msec. $T_1$ is 72 msec., each of $Ti_1$, and $Ti_3$ is 2 msec., $Ti_2$ is 3 msec., and $Ti_4$ is 5 msec. The time required for an interruption to occur and be executed, or $T_1 + Ti$ varies from 74 msec. to 77 msec. and thus the variation of the time is small. Consequently, the time interval $T_1 + Ti$ can be practically used without trouble for the base of the flickering period of alarm lamp or interrupting period of alarm sound.

If only the turn signal function is considered, it is determined whether the turn signal switch 21 is operated or not, at each occurence of interruption, namely, at the period of $T_1 + Ti$. If the switch is operated, an interrupting signal is transmitted to the turn signal relay 187. At this time, an instruction for turning the relay 187 on or off is issued each time the turn signal enters in the process routine. Thus, the output instruction is reversed each time it passes through this routine, and the interruption period of the turn signal is twice the time to which the timer is set, or $T_1 + Ti$.

Figure 5:
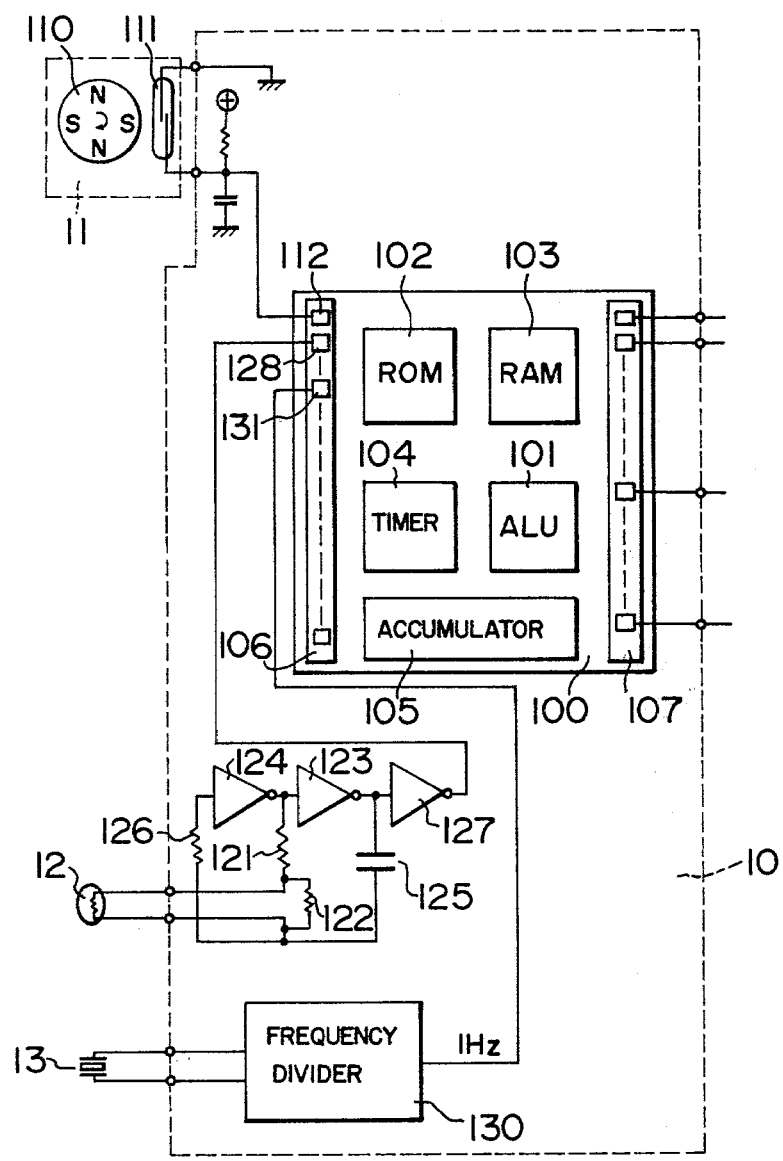
FIG. 5 is a detailed diagram of the controller in FIG. 1.

Now, the controller 10 will be described in detail with reference to FIG. 5. The controller 10 includes a control computer 100 which further includes an arithmetic circuit (ALU) 101, a read-only memory (ROM) 102 for storing program steps, a random access memory (RAM) 103 for establishing data, a timer 104, an accumulator 105, and input and output register groups 106 and 107.

The car speed sensor 11 has a permanent magnet 110 mounted on a car speed meter and a reed switch 111 which detects the rotation of the permanent magnet 110 to produce a pulse. This pulse is applied directly to a register 112 of the input register group 106 having a plurality of registers, in the computer 100, and detected for its level of "0" or "1". When the input pulse changes from "0" to "1", or "1" to "0", the input pulse is counted as one pulse and then stored in a region of the RAM 103. In this case, the greater precision of the car speed data, the longer time it takes for counting the pulses, but the response to the car speed is delayed longer. In this embodiment, counting of the pulses is continued until the interruption occurs four times, and then the data is fixed. This determined data is used until the next fourth interruption and thus it is necessary to move it to a region different from the above-mentioned region in the RAM 103. This movement of the data is shown in FIG. 4 of the program flow chart at the M=3 routine. When the fourth interruption occurs, the region of the RAM must be cleared for the next count.

On the other hand, to measure engine temperature, a thermistor 12, the resistance of which depends on temperature, is used. Since the thermistor 12 itself remarkably changes its resistance in response to temperature, the thermistor 12 is connected in series with a resistor 121 and in parallel with a resistor 122 so that the resultant resistance is changed as linearly as possible with respect to temperature. One end of the resultant resistor is connected to the junction between the input of an inverter 123 of a digital logic element and the output of another inverter 124. The output of the inverter 123 is connected to one end of a capacitor 125 and the input of the inverter 124 to one end of a resistor 126. The other end of the resistor 126 is connected to the other ends of the resistor 122 and capacitor 125, thereby forming a feedback circuit for self oscillation.

The frequency of this oscillation is determined substantially by the values of the capacitor 125 and the resultant resistance. Therefore, the change of the engine temperature will cause the resultant resistance to change and thus the oscillation frequency to vary. The output of the inverter 123 is waveform-shaped by another inverter 127, the output of which is then applied to an input register 128 in the computer 100. Thus, to the input of the computer 100 is applied a pulse having a frequency corresponding to the temperature of engine. The computer 100 counts the pulses of engine temperature in quite the same way as that of counting the car speed pulses as described above. In this embodiment, since the control function for the engine temperature is designed to operate at the fourth interruption, and thus the data can be used as soon as it is established, it is unnecessary to move the data to another region in the RAM for the next interruption as in the case of counting the car speed pulses. Thus, as soon as data is established and a series of processing operations for engine temperature have been finished, clearance is made for the next data establishment.

The output of the crystal oscillator 13 is frequency divided by a frequency divider 130 into a frequency of, for example, 1 Hz.

The output of the divider 130 is applied to an input register 131 in the computer 100. The computer 100 counts the input pulse each time the level changes from "0" to "1" and stores the count value.

Since the computer also functions as a clock, it goes without saying that the counting operation is performed in sexagenary and duodecimal notation.

Figure 6:
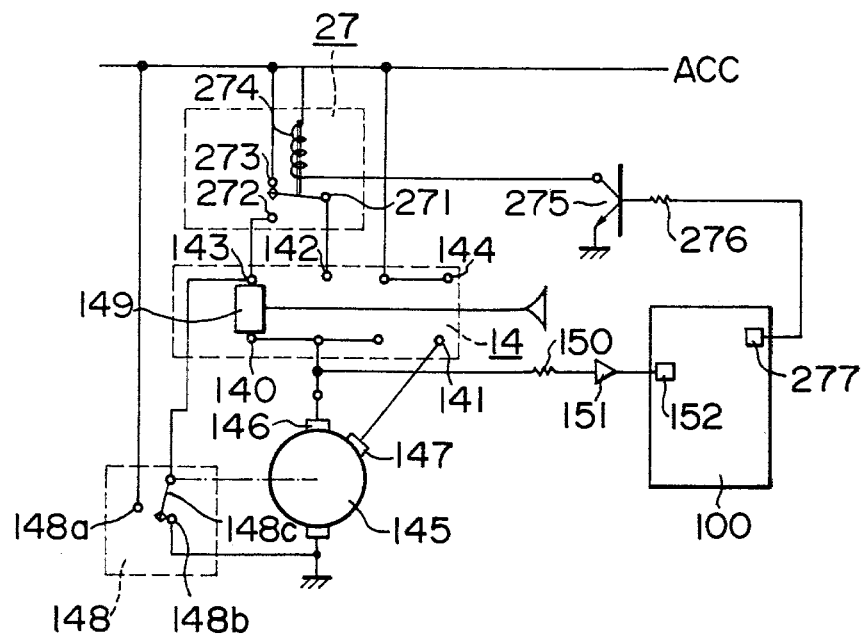
FIG. 6 shows a wiper drive circuit.

FIG. 6 shows one example of a wiper drive circuit, in which the wiper switch 14 has five independent contacts 140 to 144. The contact 140 is connected to a low-speed winding tap 146 of a wiper motor 145, and the contact 141 is connected to a high-speed winding tap 147. The contact 142 is connected to a mid point 271 of the wiper relay 27. The contact 143 is connected to a A-contact 272 of the wiper relay 27, and also to a mid point 148c of a rotary switch 148 which is turned on or off by the rotation of the axis of the wiper motor 145. The contact 144 of the wiper switch 14 is connected to an accessory power supply ACC. A B-contact 148b of the rotary switch 148 is grounded, and an A-contact 148a is connected to the accessory power supply ACC. Similarly, a B-contact 273 of the wiper relay 27 is also connected to the accessory power supply ACC.

The wiper switch 14 includes a slidable member 149 by which the contact 140 is connected to the contact 143 when the wiper switch is in the off-state. Connection between contacts 140 and 142 is made upon intermittent operation, connection between contacts 140 and 144 is made upon low-speed stationary operation, and connection between contacts 141 and 144 is made upon high-speed stationary operation.

One end of a field winding 274 of the wiper relay 27 is connected to the accessory power supply ACC, and the other end of the field winding 27 is connected to the collector of an NPN transistor 275. The NPN transistor 275 has its emitter grounded and its base connected through a resistor 276 to an ouput register 277 of a plurality of output registers in the computer 100. The low-speed winding tap 146 of the wiper motor 145 is connected through a resistor 150 and a buffer 151 to an input register 152 of the computer 100.

When the wiper switch is in the off-state, the slidable member 149 is positioned to connect the contacts 140 and 143, and in the rotary switch 148 the contact 148c is made in contact with the contact 148b. Thus, the wiper motor 145 stops at a constant position because of the short-circuit condition.

Then, the wiper switch 14 is operated to be in the intermittent position where the contact 140 is connected to the contact 142 but disconnected from the contact 143.

Figure 7:
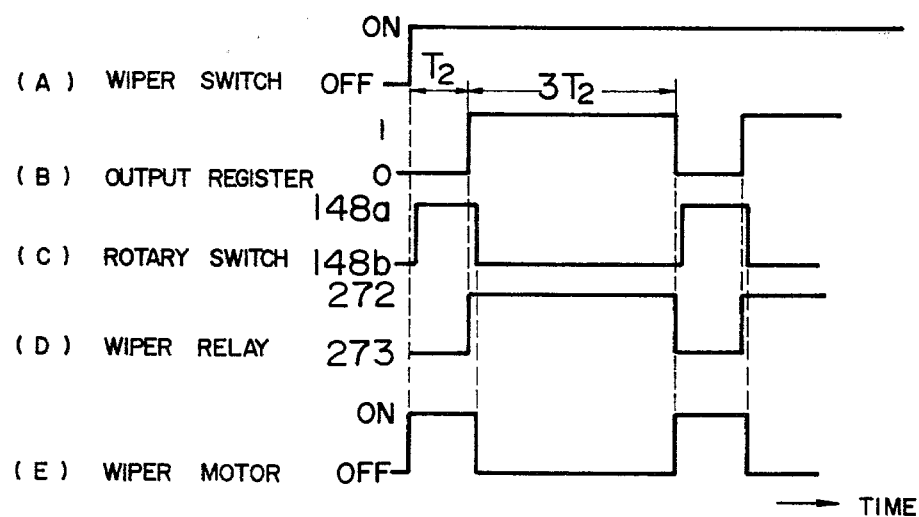
FIG. 7 is a timing chart of the operation of FIG. 6.

FIG. 7 is a timing chart of each part upon intermittent operation. When the wiper switch 14 is in the intermittent position (ON-state), the B-contact 273 of the wiper relay 27 is connected to the contact 271 which is thus connected to the power supply ACC. Consequently, the power is supplied to the wiper motor 145 through the contacts 273, 271, 142, 149 and 140 and the low-speed winding tap 146. Thus, the input register 152 of the computer 100 is given a "1" level, and at the same time the wiper motor 145 starts rotating. When the motor 145 is moved by, for example, about ⅛ turn, the rotary switch 148 changes the state such that the contact 148c is connected to the contact 148a but disconnected from the contact 148b. After a period of time $T_2$ has elapsed, for example, after 2 seconds, the output register 277 of the computer 100 is at a "1" state, to thereby turn on the NPN transistor 275, which thus allows current to flow through the winding 274 of the wiper relay 27. Thus, the contact 271 is connected to the contact 272 away from the contact 273 through which the power has been supplied. At this time, since the contact 148a of the rotary switch 148 is connected to the power supply ACC, the wiper motor 145 is continuously supplied with electric power through the contact 148c, the contact 143 of the wiper switch 14, the relay contacts 272 and 271, the contact 142 of the wiper switch 14, the slidable member 149, the contact 140 and the low-speed winding tap 146. Thus, the motor 145 continues to rotate (for example, ¼$T_2$). However, when the rotary switch 148 is rotated by about one turn, the contact 148c is again connected to the contact 148b, thereby short-circuiting the wiper motor 145, which thus stops at the constant position. The computer 100 detects the elapse of time from that a time. After time of, for example, 3$T_2$, or six seconds has passed, the content of the output register 277 is returned to "0". Then, the wiper motor 145 starts to rotate and similar operations are repeated.

The intermittent wiper is used on a relatively light rain or snow, and the amount of rain or snow deposited on the front glass per unit time depends on the speed of car even at a constant rate of rain or snow. Data on the car speed is stored in the RAM, and therefore the period of the intermittent wiper operation may be determined by reading the data and selecting one of the predetermined ranges of car speed to which proper values of wiper intermittent operation time are allotted, or by functional computation on the read data of car speed.

Figure 8:
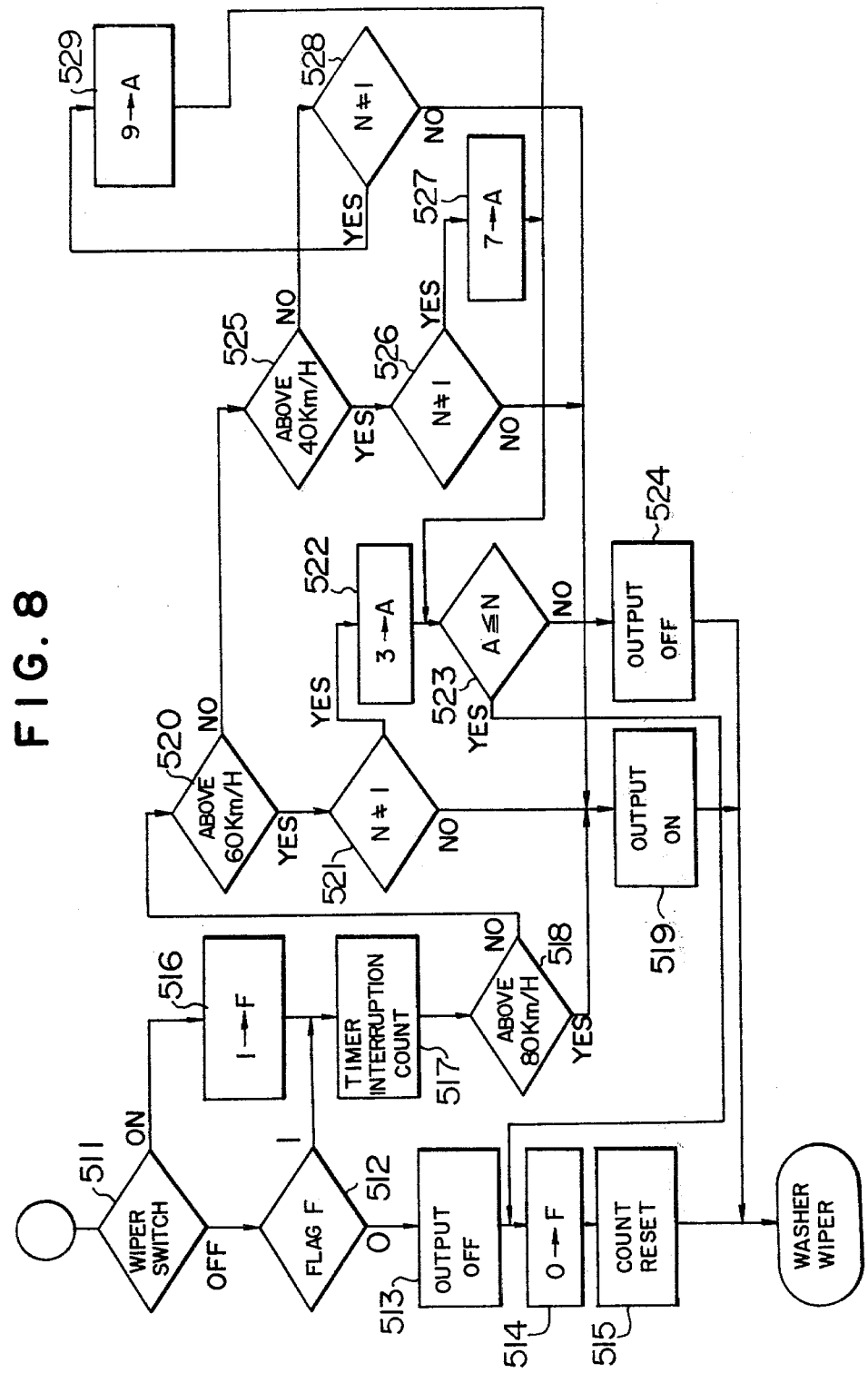
FIG. 8 is a flow chart of the computer control in another example of the wiper drive circuit.
Figure 9A:
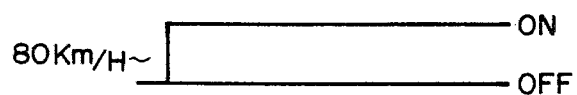
FIGS. 9a to 9d are timing charts of the operation of FIG. 8.
Figure 9B:
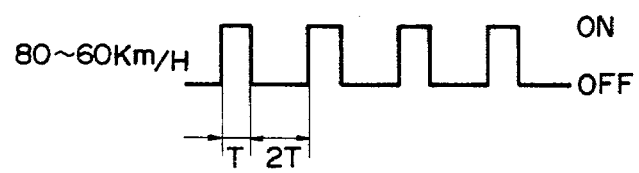
Figure 9C:
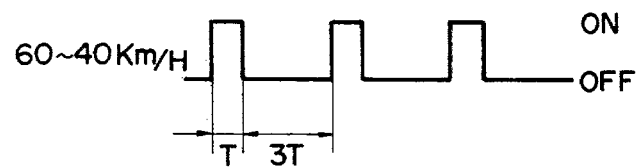
Figure 9D:
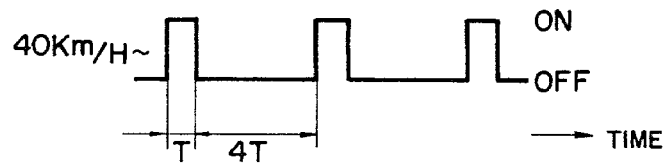

FIG. 8 is a flow chart of a microcomputer program for the intermittent operation in accordance with the car speed. When a request for timer interruption takes place, whether the intermittent wiper switch (140-142)

is in the on-state or off-state is determined at a step 511. If the wiper switch (140-142) is in the off-state, the computer goes to a step 512 where a flag is checked. If the intermittent wiper switch has once been in the on-state, the computer goes to a step 517 because a flag is set, i.e., "1" is set. If the wiper switch has never been in the on-state, the flag here is zero and thus the computer goes to a step 513, at which an instruction of stopping the output signal is issued, that is, the output register of the computer 100 produces an OFF-signal "0" to stop the operation of the wiper. If the intermittent wiper switch 14 becomes in the on-state at the step 511, the computer goes to a step 516 where a flag is set. Thus, the computer 100 always goes to a step 517 through the step 512 until the flag is reset. At step 517, the number of times the computer enters this flow chart upon timer interruption is counted. By arbitrarily selecting the value of the count a signal which is sent to the output register of the computer 100 is controlled. That is, at a step 518, the number of car speed pulse counted in the main routine is compared and a decision is made whether the car speed is greater or less than 80 Km/hour. If the car speed is greater than 80 Km/hour, the intermittent operation is not necessary, and thus the computer 100 proceeds to a step 519 wherein an on-signal of "1" is produced from the output register. Thus, the wiper motor 145 rotates continuously (FIG. 9a). If the car speed is less than 80 Km/hour, the computer 100 goes to a step 520 where a decision is made whether the car speed is greater or less than 60 Km/hour. If the car speed is greater than 60 Km/hour, the computer 100 goes to a step 521 where the count number N of timer interruptions at the step 517 is compared. If the count number is 1, the computer 100 goes to the step 519 where a "1" signal is produced from the output register. When the computer again goes to the step 521 in a similar manner, since the count number becomes 2 at this time, the computer 100 goes to a step 522 wherein a 3 is registered in an accumulator register. At a step 523, the registered value A is compared with the count number N of timer interruptions. If the registered value in the accumulator register is not equal to the count number of timer interruptions interruption, the computer goes to a step 524 where the output signal is "0". Thereafter, if the count number of timer interruptions equals the registered value in the accumulator, the computer goes to the step 514 where the flag raised at the step 516 is reset. Then, at the step 515, the count number of timer interruption counted at the step 517 is reset. Thereafter, the above operations are repeated. Thus, if the car speed is in the range from 80 Km/hour to 60 Km/hour, the intermittent wiper 14 is operated with cycles each consisting of an ON-time of T and an OFF-time of 2T, as shown by FIG. 9b. At a step 525, a decision is made of whether the car speed is greater or less than 40 Km/hour. If the car speed is greater than 40 Km/hour, the count number of timer interruptions is compared at a step 526. If the count number is 1, the computer, similarly to the above description, goes to the step 519, where a "1" signal is produced from the output register. If the count number is 2 or above, the computer goes to a step 527 where 7 is registered in the accumulator register. Thereafter, the registered value at the step 523 is compared with the count number of timer interruptions similarly as described above. Unless the registered value equals the count number of timer interruptions, the computer goes to the step 524 where a "0" signal is produced as an OFF output signal. Then, when the count number of timer interruptions equals the registered value in the accumulator, the computer 100 goes to the step 514 where the flag is reset and the count number of timer interruptions is reset. Subsequently, the same operation is described above is repeated. Thus, when the car speed is in the range from 60 Km/hour to 40 Km/hour, the intermittent wiper operation is performed with cycles each consisting of an ON-time interval of T and an OFF-time interval of 3T as shown in FIG. 9c. If the car speed is less than 40 Km/hour at the step 525, the computer goes to a step 528 where the count number of timer interruptions is compared. If the count number is 1, the computer goes to the step 519 where a "1" signal is produced as an ON output. If the count number is 2 or greater, the computer goes to a step 529 where 9 is registered in the accumulator. At the step 523, the registered value and the count number of timer interruptions are compared. Unless the registered value equals the count number of timer interruptions, the computer goes to the step 524 where a "0" signal is produced as an OFF output. When the count number of timer interruptions equals the registered value of timer interruptions, the computer goes to the step 514 where the flag is reset and the count number of timer interruptions is reset. Then, the same operation is described above is repeated. Thus, if the car speed is less than 40 Km/hour, the intermittent wiper operation is performed with cycles each consisting an ON-time interval of T and an OFF-time interval of 4T as shown by FIG. 9d.

According to the embodiment, the car speed range for the intermittent wiper operation is divided into 80 Km/hour or above, to 60 Km/hour from 80 Km/hour, 40 Km/hour from 60 Km/hour, and 40 Km/hour or below. These ranges of speed may naturally be selected at will depending on the software of the microcomputer used, and the ON- and OFF-time interval for the intermittent wiper operation may also be arbitrarily selected.

In FIG. 6, when the slidable member 149 of the wiper switch 14 is moved to connect the contact 140 to the contact 144, electric power is always supplied to the low-speed winding tap 146 of the wiper motor 145. When the slidable member 149 is moved to connect the contact 141 to the contact 144, electric power is supplied to the high-speed winding tap 147. The two above conditions are the so-called stationary mode of operation independently of the operation of the computer 100. Therefore, if the computer 100 should break down, the wiper switch 14 is well satisfactorily operated. If this stationary mode of operation were controlled by the computer, the reliability would be reduced; that is, upon the failure of the computer there might occur a great danger.

The washer used upon cleaning the front glass is designed to operate independent of the wiper in the prior art.

However, since it is necessary to operate the wiper upon ejection of washer liquid, the present invention proposes a wiper mechanism in which the wiper operates when the washer switch 15 is turned on.

Figure 10:
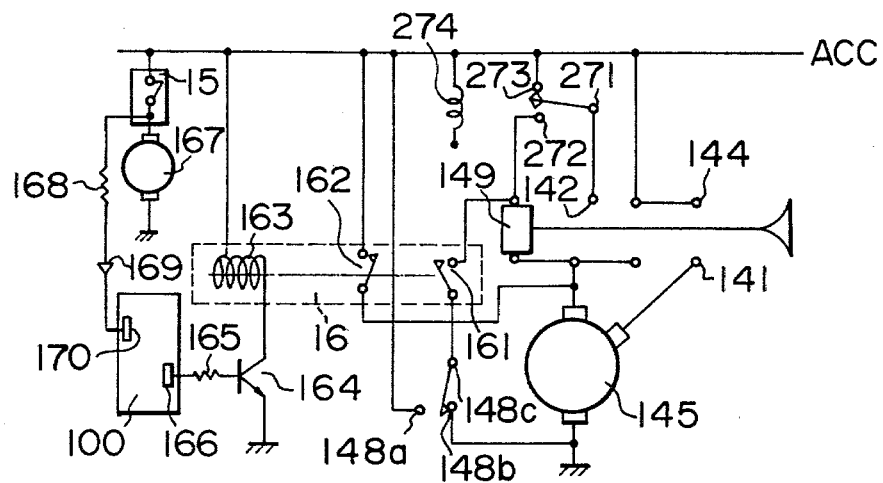
FIG. 10 shows an example of a wiper control ganged with a washer.

As shown in FIG. 10, a washer relay 16 is provided which includes a normally closed circuit and a normally open circuit. Between the contact 143 of the wiper switch 14 and the mid contact 148c of the rotary switch 148 there is connected a normally closed contact circuit 161 of the washer relay 16. A normally open contact circuit 162 is connected between the accessory power supply ACC and the low-speed winding tap 146 of the wiper motor 145. A field winding 163 of the relay 16 is connected between the collector of an NPN transistor 164 and the power supply ACC. The NPN transistor 164 has its emitter connected to ground and its base connected through a resistor 165 to an output register 166 of the computer 100.

The washer switch 15 is connected between a washer motor 167 and the power supply ACC, the signal from the switch 15 is applied through a resistor 168 and a buffer 169 to an input register 170 of the computer 100.

When the wiper switch 14 is in the off or intermittent state, and when the washer switch 15 is turned on, the washer motor 167 rotates to eject a cleaning liquid onto the front glass and at the same time the input register 170 of the computer 100 becomes "1". Then, the output register becomes "1" for several seconds thereby turning on the NPN transistor 164.

Thus, the winding 163 is exited to close the contact 162 and open the contact 161. Consequently, the wiper motor 145 starts rotating and continues to rotate for several seconds, wiping the front glass. In this case, the contact 161 serves to prevent the power source from being shortcircuited to ground if the contact 143 of the wiper switch 14 remains connected to the mid contact 148c of the rotary switch 148.

The function of the wiper drive may be performed in the main routine and the timer range setting may be carried out in the interruption routine.

Control of the turn signal will next be described.

Figure 11:
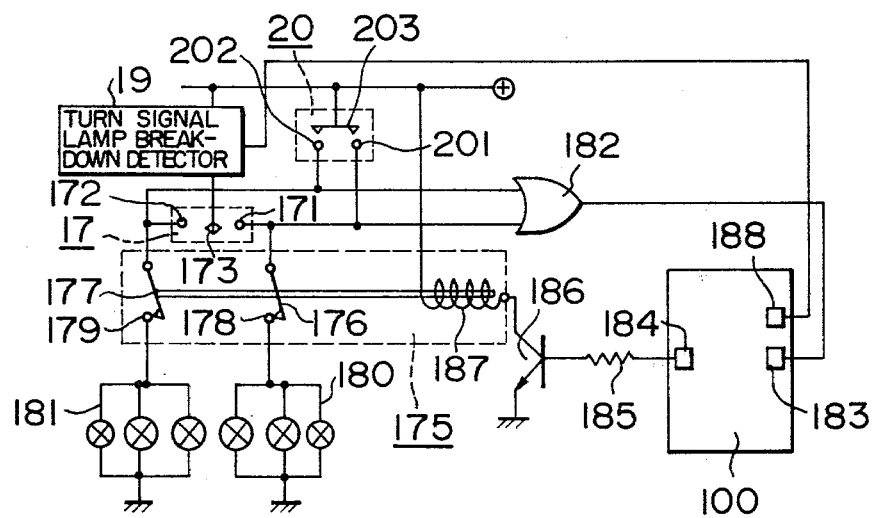
FIG. 11 shows an example of a turn signal drive circuit.

In FIG. 11, the turn signal switch 17 is a three-position switch having a right contact 171, a left contact 172 and a movable contact 173 which can be made in contact with the contact 171 or 172 or positioned intermediate therebetween by an arm. The disconnection detector 19 is connected between the movable contact 173 and the positive electrode of the battery.

A turn relay 175 having two normally closed contact circuits one of which, as a movable contact 176, is connected to the right contact 171 of the turn signal switch 17 and the other of which, as a movable contact 177, is connected to the left contact 172. A stationary contact 178 made in contact with the movable contact 176 and a stationary contact 179 made in contact with the movable contact 177, are connected to a right traffic indicator lamp group 180 with a plurality of lamps and a left traffic indicator lamp group 181 with a plurality of lamps, respectively. The signals from the right and left contacts 171 and 172 of the turn switch 17 are applied to an OR circuit 182, the output of which is applied to an input register 183 of the computer 100. An output register 184 of the computer 100 is connected through a register 185 to the base of an NPN transistor 186, the collector of which is connected to a field winding 187 of the turn relay 175 and the emitter of which is grounded. A hazard switch 20 is provided which has two stationary contacts 201 and 202, and a movable contact 203 simultaneously made in contact with the two contacts. The stationary contact 201 is connected to the right contact 171 of the turn switch 17, and the stationary contact 202 to the left contact 172.

The movable contact 203 is connected to the positive electrode of the battery.

If the turn switch 17 is operated to connect to, for example, the right contact, since the turn relay 175 is of the normally closed type, the right traffic indicator lamp group 180 is instantly energized and at the same time a "1" signal is applied through the OR circuit 182 to the input register 183 of the computer 100.

The computer 100 goes away from the main routine which has been executed so far, when a timer interruption is requested, and then goes to the interruption routine as shown in FIG. 4.

Figure 12:
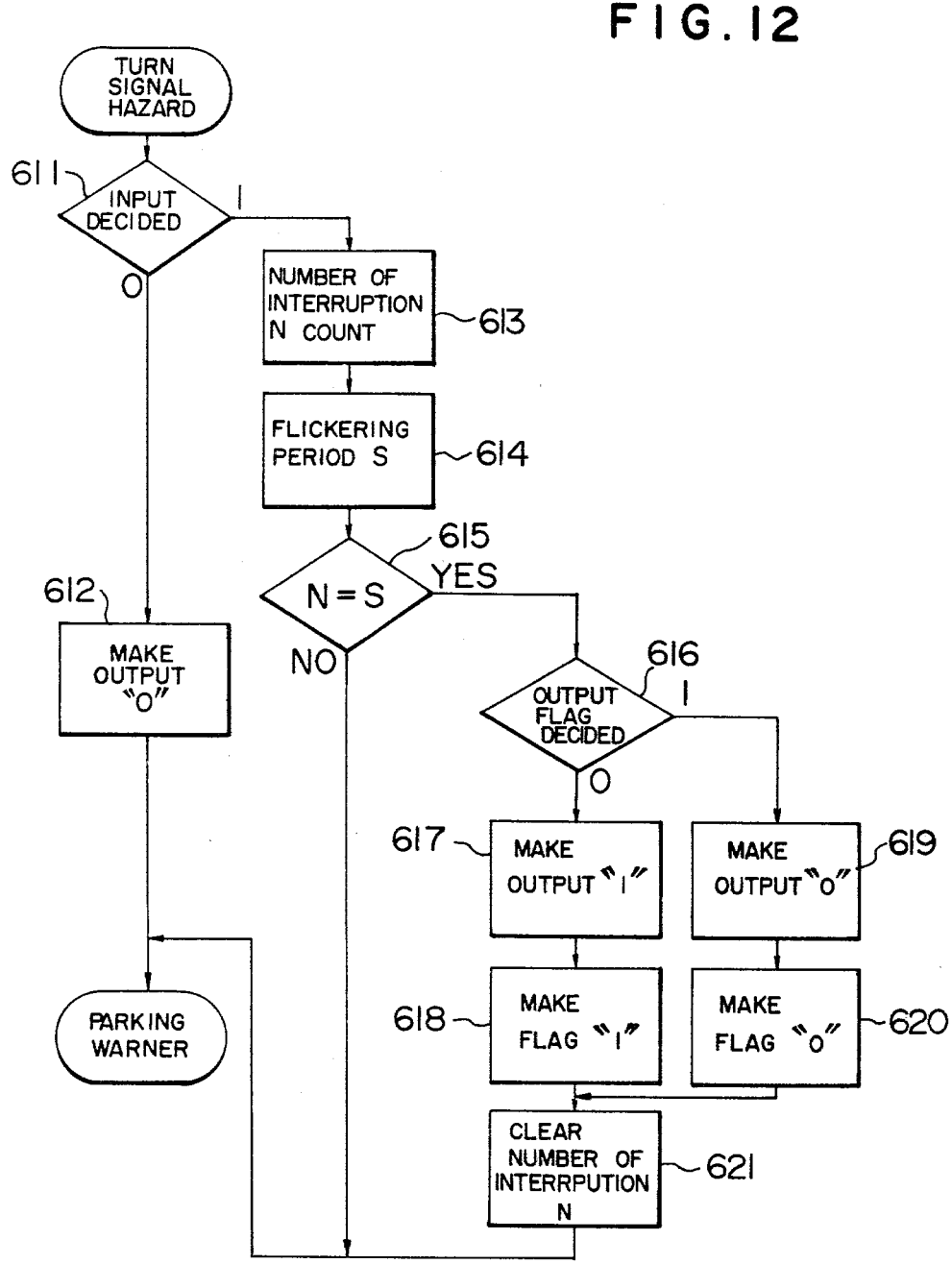
FIG. 12 is a flow chart of the turn signal control.

The control of turn signal in the interruption routine is shown in FIG. 12.

At a step 611, a decision is made whether the turn signal switch 17 is turned on. If the switch is not turned on, the input register 183 of the computer 100 remains at "0", and thus the computer goes to a step 612. The transistor 186 is turned off since the output register 184 of the computer is at "0". At this time, the lamp groups 180 and 181 are also not energized. If the turn signal switch 17 is turned on, the input register 183 of the computer 100 is at "1", and thus the control of traffic indication is started. That is, at a step 613, the number of times the interruption occurs is stored, and at a step 614 a flickering period S is specified. At a step 615, a comparison is made of the flickering period S and the number of times of interruption N. Until N equals S, the output signal from the computer 100 is retained. That is, if the turn signal switch 17 is turned on, the contacts 176–179 of the turn relay 175 connected therethrough to the lamp group 180 or 181 are break contacts and the movable contacts 176, 177 are connected to the fixed contacts 178, 179 respectively and thus the lamps are immediately energized. After the elapse of a constant time (S), the computer goes to a step 616, where a decision is made on the output flag. If the previous output flag is "0", the output signal of the computer 100 becomes "1" at a step 617, extinguishing lamps and at a step 618 the output flag is made "1". If the previous output flag is "1". the output signal of the computer 100 is made "0" at a step 619, and at a step 620 the output flag is made "0". At a step 621 the number of times of interruption stored is cleared. Thus, the flicking of the lamp groups 180 and 181 is performed accurately and stably.

Figure 13:
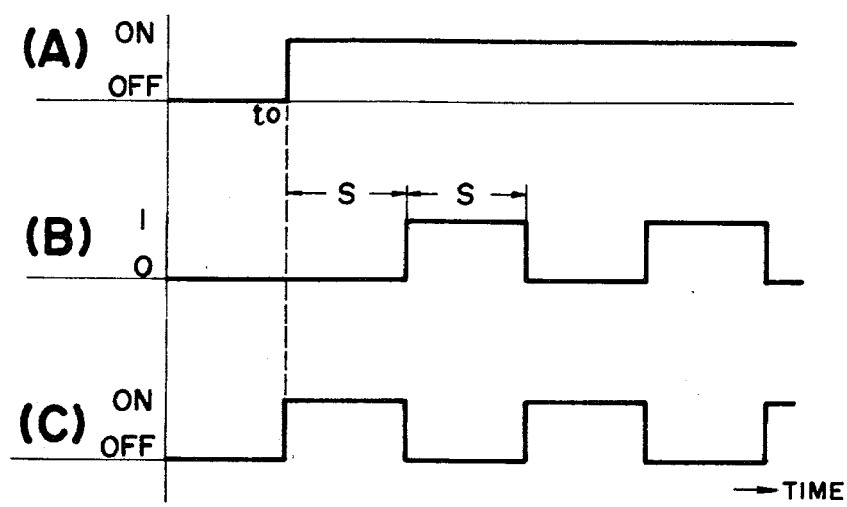
FIG. 13(A) shows the operation of the turn signal switch, 13(B) shows the output of the output register 184 of the computer, 13(C) shows the condition of lighting the turn signal lamp.

As shown in FIG. 13, if the turn signal switch 17 is turn on at time $t_0$ (A), the output register 184 of the computer first sends out a "0" output and, a fixed time S later, a "1" output. After the elapse of a fixed time S, again, an output of "1" is produced therefrom and so on, as shown in FIG. 13 (B). Therefore, the field winding 187 of the turn relay 175 is intermittently excited and thus the right traffic indicator lamp group flickers (FIG. 13 (C)). If the hazard switch 20 is turned on, both the traffic indicator lamp groups flicker with the same period.

The disconnection detector 19 as shown in FIG. 11 serves to detect an abnormal condition from the difference between the resistances or currents in the traffic indicator lamp groups upon normal flickering and disconnection. When an abnormality occurs, a "1" signal is applied to the input register 188 of the computer 100 at a certain timing and upon a normal condition, "0" signal is similarly applied thereto.

Figure 14:
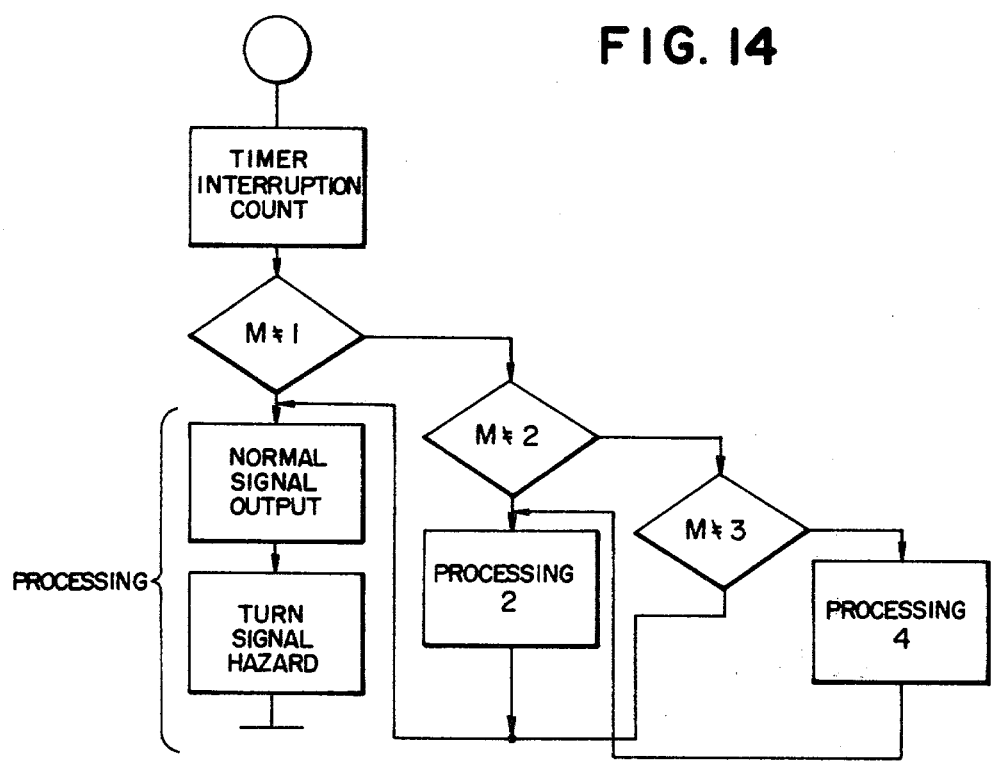
FIG. 14 is a flow chart of the order of detecting the failure of the turn signal lamp drive circuit.

In accordance with the flow chart as shown in FIG. 4, the turn signal is processed at each interruption. However, in the normal condition, the output is reversed at every fourth time, for example, and if an abnormality occurs, that is, if a "1" signal is supplied from the disconnection detector 20, the output can be reversed at every second time and thus with a short period. It is stipulated in the law that the turn signal lamp shall be mounted on the car, and it must be operated even though the computer should break down. Thus, it is first necessary to detect when the computer has broken down. In accordance with the present invention, a different kind of processing is made at each interruption as described above and the turn signal lamp is controlled at each interruption as shown in FIG. 4. In order to detect whether at least the turn signal control is abnormal or not because of computer breakdown, it is necessary to provide a program for generating a pulse, before and after the turn signal processing operation as shown in FIG. 14.

Figure 15:
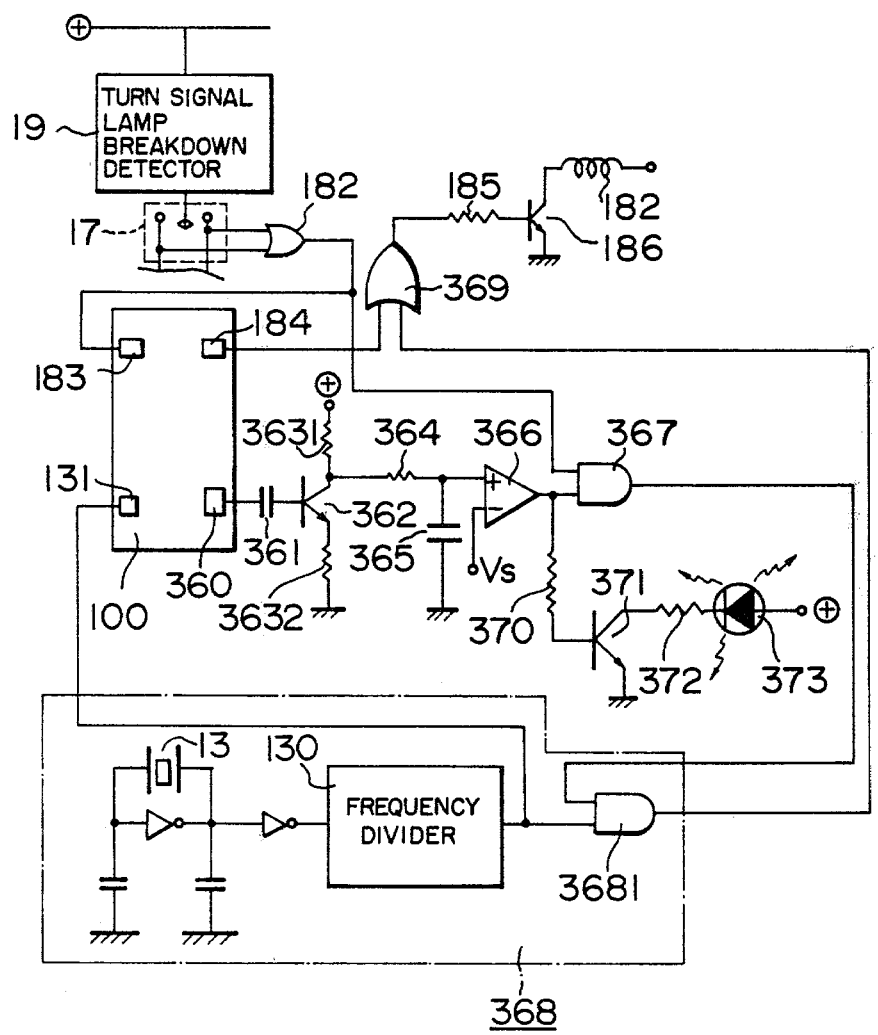
FIG. 15 shows an example of the protective circuit for the turn signal lamp drive circuit.

This pulse is produced from an output register 360 of the computer 100 in FIG. 15. In this embodiment, the output is reversed at each execution of this program, or at each interruption. The output pulse may be produced in the interruption processing operation as "0"→"1"→"0" or in reverse order.

Referring to FIG. 15, the output from the output register 360 of the computer 100 is applied to the base of an NPN transistor 362 through a capacitor 361. To the collector of the transistors 362 are connected resistors 3631 and 364. The resistor 3631 is connected to the positive end of the power supply, and the resistor 364 is connected to one end of a capacitor 365, the other end of which is grounded.

The emitter of the transistor 362 is grounded through a resistor 3632. The resistor 364 and the capacitor 365 form a so-called integrating circuit, the output of which is applied to the non-inverting input of a voltage comparator circuit 366, the inverting input of which is supplied with a reference voltage $V_s$. Since the output register 360 of the computer 100 and the transistor 362 are coupled by the capacitor 361, the transistor 362 is in the off-state when the output stays at "1" or "0", and thus the voltage across the capacitor 365 is increased. Under normal operation of the computer 100, the register 360 produces a signal of alternate "1" and "0" with a certain period, and thus the integrating circuit has a D.C. level at its output. If the reference voltage to the comparator 366 is made slightly higher than this level at the output of the integrating circuit, the output of the comparator is always at the "0" level.

If the computer 100 breaks down, the output of the integrating circuit is increased with the result that the comparator 366 produces a "1" at its output.

The output of the comparator circuit 366 is applied to one input of a two-input AND circuit 367, and the output of the OR circuit 182 shown in FIG. 6 is applied to the other input of the AND circuit 367. The output of the AND circuit 367 is applied to an osicllation circuit 368.

The oscillation circuit 368 includes an AND circuit 3681 which is supplied at one input with the output of the AND circuit 367 and at the other input with the output of the frequency divider circuit 130.

When the AND circuit 367 produces an output of "1", the oscillation circuit 368 starts oscillating with a certain period, for example, at a frequency of 1 Hz. Thus, the turn signal switch or hazard switch is turned on, and only when the computer 100 breaks down, does the oscillation circuit 368 oscillate. The output of the oscillation circuit 368 is applied to one input of a two-input OR circuit 369, and to the other input of the OR circuit 369 there is applied the output of the turn signal output register 184 of the computer 100 as shown in FIG. 11. The output of the OR circuit 369 is applied through the resistor 185 to the base of the transistor 186 which serves to drive the turn signal relay 175. With the above arrangement, when the computer 100 functions normally, the turn signal lamp is turned on and off by the signal from the computer 100, while when the computer is in an abnormal condition, the lamp is turned on and off by the signal from the oscillation circuit 368.

The oscillation circuit 368 utilizes the output of the frequency divider circuit 130 for making clock signals for computer control and requires no special oscillator. These frequency divider circuit 130 and the crystal oscillator 13 generally hardly break down as compared with the computer 100, and can be well practically used for protective circuits.

The output of the voltage comparator circuit 366 is applied through a resistor 370 to the base of an NPN transistor 371 the emitter of which is grounded. The collector of the transistor 371 is connected to the positive end of the power supply through a series circuit of a resistor 372 and a photo-diode 373. If the computer 100 is in an abnormal condition, the transistor 371 is turned on, permitting the light-emitting diode 373 to be energized, thereby indicating a breakdown of computer 100.

According to the invention as described above, the turn signal lamp can be driven with a stable and precise period.

The alarm circuit 21 includes an oscillation circuit 210, a frequency divider 211 and a selecting switch 212 as shown in FIG. 16.

In FIG. 16, the oscillation circuit 210 is constructed similar to the circuit for converting the engine temperature to an oscillation pulse. The output of the oscillator 210 has a fixed frequency, for example, 2400 Hz, and is applied to the selecting switch 212 and the frequency divider 211. The selecting switch 212 includes, for example, three electronic switches one of which, as electronic switch 2121, is supplied at its input with the output of the oscillator 210. The frequency divider 211 includes a ⅓-frequency divider 2111 and a ½-frequency divider 2112. The output of the oscillator 210 is first applied to the ⅓-frequency divider by which it is divided into a frequency of 800 Hz. This pulse signal is applied to an electronic switch 2122 and at the same time to the ½-frequency divider 2112 by which it is divided into a frequency of 400 Hz. The 400-Hz oscillation pulse is applied to the remaining electronic switch 2123 of the selecting switch 212. The outputs of the three electronic switches 2121, 2122 and 2123 are controlled by control terminals 2124, 2125 and 2126, respectively, which are supplied with the signals from the output registers 213, 214 and 215 of the computer 100. The output of the selecting switch 212, at which the outputs of the three electronic switches are combined, is applied through a resistor 216 to the base of an NPN transistor 217. The collector of the NPN transistor 217 is connected to the positive end of the power supply through a series circuit of a resistor 218 and the alarm speaker 23.

If a "1" pulse is applied to for example the control terminal 2124 of the electronic switch 2121, a sound of 2400 Hz is emanated from the loudspeaker 23. In addition, if alternate "1"s and "0"s with a particular period are applied to the control terminal 2124, an intermittent sound of 2400 Hz is produced from the speaker 23. If the period of the input pulse to the control terminal 2124 is doubled or increased four times, the resulting intermittent sound can be identified. Similarly, a sound of 800 Hz and 400 Hz can be controlled to be intermittent; thus, the combination of the frequency of sound and the intermittent period provide various kinds of alarming signal sounds.

As described above, a different kind of alarm sound can be selected, and in this embodiment the following alarm sound is provided.

When the starter switch 24 is turned on, the signal therefrom is applied to an input register 241 of the computer 100 and continuous sound of 400 Hz or an intermittent sound of 400 Hz with a predetermined period is emanated for several seconds from the loudspeaker 23. At the same time, the output of an output register 242 of the computer 100 is applied through a resistor 243 to the base of a transistor 244, which is driven thereby to energize a lamp 245. Thus, the lamp indication and sound signal call the driver's attention to fasten the seat belt. If the seat belt is tightened, the seat belt switch 25 is actuated to supply a signal to an input register 251 of the computer 100, thereby immediately extinguishing the alarm sound alone or both the sound and light indication.

If the door is half closed or opened, the door switch 26 is closed to supply a signal to a register 261. At this time, if the light switch 28 is turned on to supply a signal to an input register 281, an intermittent sound of, for example, 800 Hz with a certain period can be emanated. If an ignition switch 29 is turned off to supply a signal to an input register 291, the door switch 26 is operated and a key-left-inserted switch 30 is operated, then an alarm sound of 800 Hz is emanated with an intermittent period different from the sound in case of the door switch 26. Moreover, when the car is driven, or the count of the car speed pulses is not zero, and if the parking brake is left on, the parking switch 31 is operated to supply a signal to an input register 311 of the computer 100, and an intermittent sound of 2400 Hz is emanated with an intermittent period.

In this invention, different alarms and controls other than those in the above description can be provided.

The signal from an output register 321 is applied through a register 322 to an NPN transistor 323. The collector of the transistor 323 is connected to the positive end of the power supply through an alarm lamp 324 for the engine cooling water temperature. Since the temperature data on engine cooling water is established or stored, if the temperature is changed to a constant value or above, the lamp 324 is intermittently turned on or flickered with a predetermined period.

Figure 17:
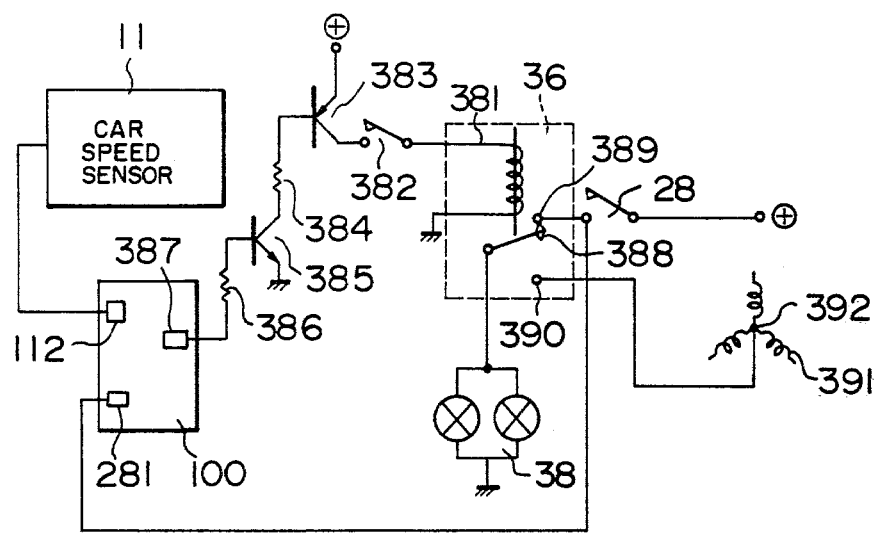
FIG. 17 shows an example of the control circuit for automatically switching the headlamp.

The automatic turning on or off of the headlamps will be now described. In FIG. 17, one end of a field winding 381 of a headlamp relay 36 is grounded, and the other end is connected to one end of a switch 382 for switching auto and manual modes. The other end of the switch 382 is connected to the collector of a PNP transistor 383, the emitter of which is connected to the positive end of the power supply, and the base of which is connected through a resistor 384 to the collector of an NPN transistor 385. The transistor 385 has its emitter grounded and its base connected through a resistor 386 to an output register 387 of the computer 100. A movable contact 388 of the headlamp relay 36 is connected to a headlamp relay 38, and a normally closed stationary contact 389 thereof is connected through the light switch 28 to the positive end of the power supply.

A normally open stationary contact 390 is connected to a neutral point 392 of an AC generator 391 of three-phase Y-connection.

If the car speed is zero, the output register 387 of the computer 100 is at "1", and the transistors 385 and 383 are turned on to be ready for operation of the headlamp relay 36. On the contrary, if the car moves even slightly, the transistors 385 and 383 are turned off. Even though the switch 382 is in the off-state, the light switch 28 is able to turn on or off the headlamp 38 irrespective of the output of the computer 100, that is; manual operation is possible. If the switch 382 is turned on, and if the the car stops, or car speed is zero, then the relay 36 is actuated to thereby connect the movable contact 388 to the normally open stationary contact 390, so that the headlamp 38 is connected to the ACG neutral point 392 thus extinguished. However, this is caused only when the light switch 28 is turned on. As soon as the car starts moving, the relay is deenergized, and thus the headlamp 38 is connected to the positive end of the power supply, thereby turned on. When the car is once moved and then stopped, the lamp can be turned off several seconds after the car speed becomes zero.

Figure 18:
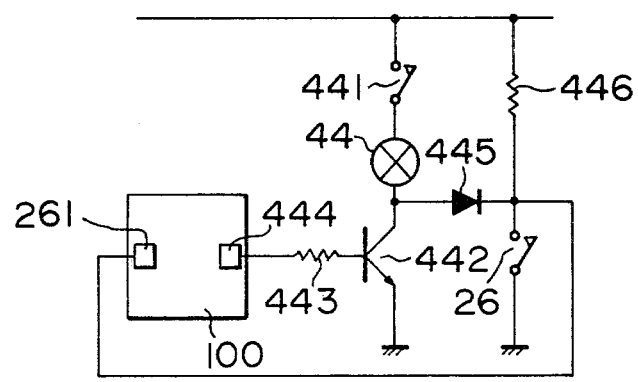
FIG. 18 shows an example of the control circuit for delaying the extinction of the room lamp.

In the embodiment of the invention, an interior lamp 44 can be extinguished with a delay. That is as shown in FIG. 18, one end of the interior lamp 44 is connected through a switch 441 to the positive end of the power supply, and the other end thereof to the collector of an NPN transistor 442, which has its emitter grounded and its base connected through a resistor 443 to an output register 444 of the computer 100. The collector of the NPN transistor 442 is connected to the anode of a diode 445, the cathode of which is connected to one end of the door switch 26 and to the positive end of the power supply through a resistor 446. The other end of the switch 26 is grounded.

When the door is closed, the switch 26 opens, and once the door is opened, a signal changing "1" to "0" is applied to an input register 261 of the computer 100. At this time, if the switch 441 is turned on, the lamp 44 is turned on. Then, when the door is closed, the input register 261 is again at "1", and the output register 444 of the computer 100 retains "1" state for several seconds during which the lamp 44 is driven by the NPN transistor 442, thus the light being extinguished with a delay.

According to the invention as described above, various kinds of functions can be collected on the car so as to be effective for the low cost and reliability.

What is claimed is:

1. A method of operating a processor-controlled system, through which the operation of automotive equipment is controlled in accordance with the state of operation of the automobile for which said automotive equipment is provided, comprising the steps of:
    (a) monitoring the operational state of said automobile and coupling signals representative thereof to said processor; and
    (b) periodically interrupting said monitoring step (a) and causing said processor to control the operation of selected ones of said automotive equipment during respective interruption control intervals, the selection of said ones of said automotive equipment occurring at times corresponding to preselected numbers of successive occurrences of the periodic interruption of step (a).

2. A method according to claim 1, wherein respective ones of successive interruption control intervals occupy different intervals of time.

3. A method according to claim 1, wherein step (b) comprises the steps of:
    (b-1) periodically generating successive interruption signals in accordance with which said monitoring step is interrupted,
    (b-2) counting said interruption signals, and (b-3) coupling signals to said processor to cause said processor control the operation of said selected ones of said automotive equipment in response to the total of the count of step (b-2) reaching an integral multiple of a prescribed count value.

4. A method according to claim 3, wherein step (b-3) comprises coupling signals to said processor to cause said processor to effectively reverse the operational state of said selected ones of said automotive equipment in response to the total of said count of step (b) reaching an integral multiple of said prescribed count value.

5. A method according to claim 4, wherein said selected ones of said automotive equipment comprise signalling indicators.

6. A method according to claim 4, wherein respective ones of said automotive equipment comprise alarm sound generating devices capable of generating a plurality of different pitch sounds, and wherein step (b-3) comprises coupling signals to said processor to cause said processor to selectively control the pitch of the sound emitting said alarms.

7. A method according to claim 1, wherein
step (a) comprises monitoring the speed of said automobile and
step (b) comprises periodically interrupting the monitoring of the speed of the automobile and causing said processor to control the intermittent operation of a wiper, as selected automobile equipment, in accordance with the speed of said automobile.

8. A method according to claim 7, wherein step (b) comprises
(b-1) periodically generally successive interruption signals in accordance with which step (a) is interrupted,
(b-2) counting said interruption signals, and
(b-3) coupling signals to said processor cause said processor to control the intermittent operation of said wiper in response to the total of the count of step (b-2) reaching an integral multiple of a prescribed count value.

9. A method according to claim 8, wherein step (b-3) comprises
(b-3-1) counting the number of times that the total of the count of step (b-2) reaches said integral multiple of said prescribed count value,
(b-3-2) establishing a reference count value in dependence upon the speed of the automobile measured in step (a), and
(b-3-3) controlling the quiescent period of the intermittent operation of said wiper in accordance with a prescribed relationship between the number of times counted in step (b-3-1) and the reference count value established in step (b-3-2).

* * * * *